Feb. 23, 1926.
W. H. FRAZINE
SHOCK ABSORBER
Filed Oct. 15, 1924
1,573,926
Fig. 1
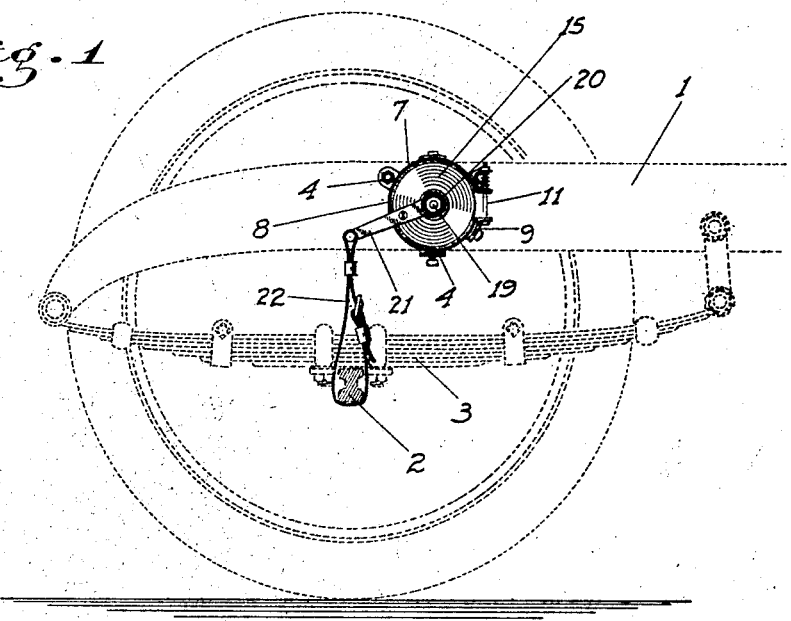
Fig. 2
Fig. 3
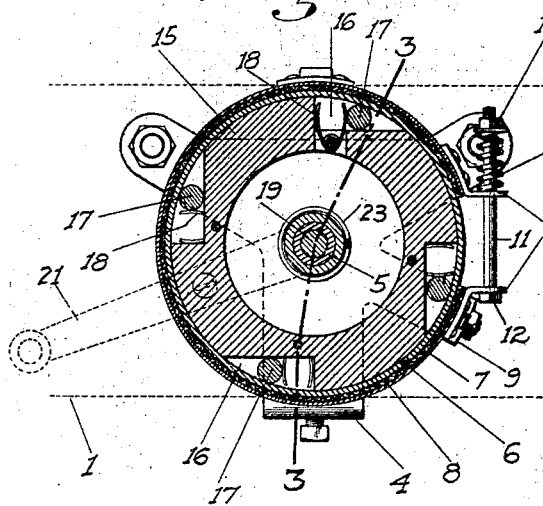
INVENTOR
William H. Frazine
BY
ATTORNEY Patented Feb. 23, 1926.

1,573,926

UNITED STATES PATENT OFFICE.

WILLIAM H. FRAZINE, OF MODESTO, CALIFORNIA.

SHOCK ABSORBER.

Application filed October 15, 1924. Serial No. 743,639.

*To all whom it may concern:*

Be it known that I, WILLIAM H. FRAZINE, a citizen of the United States, residing at Modesto, county of Stanislaus, State of California, have invented certain new and useful Improvements in Shock Absorbers; and I do declare the following to be a full, clear, and exact description of same, reference being had to the accompanying drawing, and to the characters of reference marked thereon, which form a part of this application.

This invention relates to improvements in shock absorbers for motor vehicles, and particularly to one of what is generally known as the "snubber" type.

The principal object of my invention is to provide a device of this character by means of which a resistance is offered to any rebound action of the springs of the car to which the device is applied, and so constructed that the extent or pressure of this resistance may be adjusted at will from the exterior of the shock absorber and without removing the same from the car or dissembling any part thereof.

A further object is to provide a device for the purpose which may be readily applied to any vehicle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved shock absorber showing the same as applied in connection with one of the front springs and axle of an automobile.

Fig. 2 is an enlarged sectional elevation of the device detached.

Fig. 3 is a cross section of the same taken substantially on line 3—3 of Fig. 2.

Referring now more particularly to the characters of reference on the drawings, the numeral 1 denotes one of the usual side frames of an automobile, 2 the front axle and 3 one of the springs on which said axle is mounted.

My shock absorber comprises a back plate or bracket member 4 adapted to be abutted against and secured to the outer face of the frame 1 a short distance to one side or the other of the axle 2. This plate has a centrally disposed sleeve or hub member 5, on which is turnably mounted a drum 6. Surrounding the drum 6 is a brake band 7 having the usual friction lining 8 which constantly bears against the outer face of the drum. This brake band is split transversely, as is customary, and one end of the same is anchored to a member 9 secured to and projecting from the back plate 4. Both ends of said brake band have outwardly projecting lugs 10 through which a bolt 11 passes. The head 12 of said bolt bears at one end against the other lug 10, and at its other end against an adjustable nut 14 on said bolt.

By this means, it will be evident that upon adjustment of the nut the tension of the spring against the adjacent lug may be altered at will, and consequently the binding pressure of the brake lining on the drum may also be altered.

Also turnably mounted on the sleeve 5 is a rotatable member 15, whose outer periphery has a neat running fit with the inner periphery of the drum 6. Cut in the outer face of the member 15 is a plurality of notches or recesses 16, one of whose faces extends at an acute angle to the drum. Freely mounted in these notches and extending transversely of the drum or parallel to the axis thereof, are rollers 17, which are forced toward the wedge shaped corner formed by the drum and the adjacent acute angled face of the recess by means of springs 18 mounted in the member 15.

This construction is one of well known character and, as will be evident, forms a one-way friction clutch structure, such that rotation of the member 15 in one direction will also cause the drum 16 to be rotated, but rotation of said member 15 in the other direction will not impart such movement to the drum 6.

The members 4, 6 and 15 are all held together in detachable but non-binding relation by means of a central bolt 19 extending through the sleeve 5 and having a nut 20 on the outer end thereof beyond the member 15.

Projecting radially from the member 15 on the outside thereof and secured thereto is an arm 21, to the outer end of which is connected a flexible member 22, such as a leather strap, which is passed about the front axle 2.

A spiral spring 23 of suitable character is disposed between the member 15 and the sleeve 5 and acts to cause said member 15 to rotate in that direction which will cause the rollers 18 to ride free of the drum 6 and not frictionally engage the latter.

In operation the shock absorber is so mounted that with a relative approaching movement between the axle 2 and the frame 1, the arm 21, and of course the member 15 to which it is connected, will move up without imparting any movement to the drum 6 by reason of the action of the spring 23.

When, however, the spring 3 tends to rebound and move the axle 2 apart from the frame 1, the clutch rollers 17 take hold against the drum 6 and tend to cause the latter to rotate. Owing to the fact, however, that the brake lining 8 is in frictional engagement with the drum, a certain resistance is set up to prevent such rotation, and while this rotation will take place it will do so very slowly, and the sudden rebound action of the spring 3 otherwise had will be considerably slowed down and softened.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A shock absorber for motor cars comprising a bracket adapted to be fixed on the frame of a car and having a central hub, a drum turnable on the hub, a rotatable element turnable on the hub independent of the drum and fitting into the latter, means enabling said element to be connected to an axle of the car whereby with the reciprocation of the axle relative to the frame said element will be rotated, one way clutch means between said element and the drum, friction means applied to the drum to resist rotation thereof, and a common means applied to the bracket for removably holding the drum and rotatable element from longitudinal movement on the bracket hub.

2. A shock absorber for motor cars comprising a bracket adapted to be fixed on the frame of a car and having a central hub, a drum turnable on the hub, a rotatable element turnable on the hub independent of the drum and fitting into the latter, means enabling said element to be connected to an axle of the car whereby with the reciprocation of the axle relative to the frame said element will be rotated, one way clutch means between said element and the drum, friction means applied to the drum to resist rotation thereof, a bolt fixed in the bracket and projecting through the hub thereof, and a nut on the bolt outwardly of the rotatable element.

3. A shock absorber for motor cars comprising a bracket member adapted to be fixed on the frame of a car, a drum turnably mounted thereon, friction means resisting turning of the drum, a rotatable member turnably mounted on the bracket independent of the drum, one way clutch means between the drum and said element, an arm projecting radially from and secured to the element, a flexible member connected to the outer end of the arm and adapted to engage an axle of the vehicle, and spring means between the bracket and rotatable element to maintain the flexible member normally taut.

4. A shock absorber for motor cars comprising a bracket member adapted to be fixed on the frame of a car, a drum turnably mounted thereon, friction means resisting turning of the drum, a rotatable member turnably mounted on the bracket independent of the drum, one way clutch means between the drum and said element, means attached to the element and adapted to be connected to an axle of the car in a manner to cause rotation of said element with the vertical movement of the axle relative to the frame of the car, and a common means for holding the bracket drum and rotatable element in proper relationship to each other.

In testimony whereof I affix my signature.

WILLIAM H. FRAZINE.